(12) United States Patent
Hodges

(10) Patent No.: US 6,612,613 B1
(45) Date of Patent: Sep. 2, 2003

(54) VEHICLE INTERIOR PANEL AND METHOD OF MAKING SAME

(75) Inventor: Kenneth J. Hodges, Orion, MI (US)

(73) Assignee: Collins & Aikman Development Company, Troy, MI (US)

( * ) Notice: Subject to any disclaimer, the term of this patent is extended or adjusted under 35 U.S.C. 154(b) by 0 days.

(21) Appl. No.: 09/587,707

(22) Filed: Jun. 5, 2000

(51) Int. Cl.⁷ .............................................. B60R 21/22
(52) U.S. Cl. ...................... 280/732; 180/90; 280/728.3; 296/70
(58) Field of Search .............................. 280/732, 728.3, 280/728.1; 180/90; 296/70

(56) References Cited

U.S. PATENT DOCUMENTS

| | | | |
|---|---|---|---|
| 4,246,213 A | 1/1981 | Takamatsu et al. | |
| 4,762,379 A | 8/1988 | Beam et al. | 312/320 |
| 5,135,253 A | * 8/1992 | Hirashima et al. | 280/732 |
| 5,328,651 A | 7/1994 | Gallagher et al. | 264/46.1 |
| 5,527,581 A | 6/1996 | Sugawara et al. | 428/71 |
| 5,714,227 A | 2/1998 | Sugawara et al. | 428/71 |
| 5,845,929 A | * 12/1998 | Schlett et al. | 280/728.3 |
| 5,997,030 A | * 12/1999 | Hannert et al. | 280/732 |
| 6,174,470 B1 | 1/2001 | Plymale et al. | 264/46.1 |

FOREIGN PATENT DOCUMENTS

| | | | | |
|---|---|---|---|---|
| EP | 456531 | * 11/1991 | | 296/70 |
| JP | 6-107038 | * 4/1994 | | 180/90 |
| WO | WO87/07873 | * 12/1987 | | 180/90 |

* cited by examiner

*Primary Examiner*—Eric Culbreth
(74) *Attorney, Agent, or Firm*—Grossman, Tucker, Perreault & Pfleger, PLLC

(57) ABSTRACT

A vehicle interior panel is provided that comprises an inner wall and an outer wall connected by an integral side wall. A portion of the panel comprises an air bag deployment opening at least partially defined by a tear guide. A portion of the panel also comprises at least one chamber located between the inner wall and outer wall of the panel. In this manner, a vehicle interior panel is provided having both an air bag deployment opening and at least one chamber in a single panel.

33 Claims, 5 Drawing Sheets

VEHICLE INTERIOR PANEL AND METHOD OF MAKING SAME

TECHNICAL FIELD OF THE INVENTION

This invention relates generally to a vehicle interior panel having an air bag door and chamber formed therein and to a method for making such a panel.

BACKGROUND OF THE INVENTION

Automotive vehicles usually include an instrument panel assembly located immediately in front of the front passenger seat. Each such instrument panel assembly is configured to house various switches, instruments and accessories. Instrument panel assemblies are also known to house inflatable restraint assemblies, defroster ducts and one or more air conditioning ducts for distributing conditioned or unconditioned air to the passenger compartment through outlet vents mounted in the instrument panel.

It is also known to form air bag doors in a portion of the instrument panel substrate that overlies the air bag dispenser of an inflatable restraint assembly. In some cases, the substrate may include the "first surface" of the trim panel, i.e., the cosmetic exterior surface that would be visible to a vehicle occupant. In other cases, the substrate may be covered by a skin with a foam in between, with the skin and foam providing a resilient protective pad type covering on the outer surfaces of the substrate.

In both first surface (i.e. substrate only) and covered (i.e. skin-foam-substrate) constructions, some provision must be made for guiding or otherwise facilitating the opening of an air bag door from the panel in which the door is formed. The air bag door in such a system opens to provide a path through which an air bag may deploy. It is desirable that whatever provision is made for this purpose includes some means for insuring that the air bag door breaks and/or tears open in a generally predictable way. To better control tearing and/or breaking, air bag doors that are formed with automotive trim or instrument panels will sometimes include regions of weakened materials, reduced thickness or scoring commonly referred to as "tear guides" or "tear seams". Tear guides and seams are weakened frangible areas designed to tear and/or break when an air bag inflates and forces the door to open. Some of these systems also employ tethers and/or hinges that retain the air bag door to the instrument or trim panel after the door has torn and/or broken open.

Known methods for forming tear guides include molding, cutting, or laser scoring. Current systems also include tear guides formed in inner surfaces opposite the outer visible cosmetic surfaces of instrument panel/air bag door structures to improve the aesthetic appearance of the instrument panel by concealing the presence of the door, or alternatively in the outer cosmetic surface.

The prior art also includes methods of forming interior automotive structures such as trim panels and instrument panels that include blow molding. Such structures are formed from a parison that is extruded then clamped between opposing halves of a mold. Gas in then injected into the parison to cause the parison to conform to cavity surface contours within the opposing mold halves.

For example, U.S. Pat. No. 5,328,651 issued Jul. 12, 1994 to Gallagher et al. discloses a method for manufacturing an automobile trim component. The method includes the step of coextruding a plastic un-foamed material and foamed material into a multilayer parison. The parison is then blow molded to a desired form. After the layers cure, the article is removed from the blow mold and is sectioned into multi-layered skin halves. One skin is placed in an injection mold and core resin is injected into the injection mold and onto the skin. The resin is then compressed against the skin to produce a shell comprising a resin core layer, intermediate foam layer, and decorative outer layer.

U.S. Pat. Nos. 5,527,581 and 5,714,227 Sugawara et al. (the Sugawara et al. patents) disclose a blow-molded interior automotive structure in the form of an instrument panel core portion and a method for making such a core, respectively. According to the Sugawara et al. patents, the core is formed from a parison that is formed by first extruding the parison in a tubular shape, pinching off an open lower end of the parison using a block system, then "pre-blowing" the parison by injecting air into the parison. The pre-blown parison is then clamped between dies of a blow molding apparatus. The dies include contours and ridges to form the outer shape of the core to include integral air conditioning and defrost air ducts. The ridges form pinched regions in the core to close the walls of the ducts. More specifically, the pinched regions cause opposing portions of inside faces of the parison to bond together to form a plurality of hollow portions in the parison. Gas in then injected into the hollow portions of the parison by a plurality of gas feed nozzles housed in the dies to cause the hollow portions of the parison to further expand and conform to the interior die surface contours within the dies. In a separate operation, a number of the hollow portions are then opened to form structures such as inlet and outlet ports for the defrost and air conditioning ducts, a recess for holding an instrument cluster assembly and a recess forming part of a glove compartment. However, the Sugawara instrument panel core is not configured to accommodate the installation of an inflatable restraint apparatus and the deployment of an air bag from the inflatable restraint apparatus.

What is needed is an interior automotive panel having an air bag door that also includes one or more air ducts. What is also needed is a method for making such a panel.

SUMMARY OF THE INVENTION

According to the invention, a vehicle interior panel is provided that comprises an inner wall and an outer wall connected by an integral side wall. A portion of the panel comprises an air bag deployment opening at least partially defined by a tear guide. A portion of the panel comprises at least one chamber located between the inner wall and outer wall of the panel. In this manner, a interior vehicle panel is provided having both an air bag deployment opening and at least one chamber in a single panel.

According to another aspect of the invention, the vehicle interior panel is part of an instrument panel assembly.

According to another aspect of the invention, the tear guide comprises an indentation of at least one of the inner wall and outer wall extending towards the outer surface of the outer wall.

According to another aspect of the invention, the tear guide comprises at least a portion of a perimeter of an air bag door.

According to another aspect of the invention, the inner wall of the panel and the outer wall of the panel comprise a pinched region at least partially defining the air bag deployment opening or the chamber.

According to another aspect of the invention, the inner wall of the panel and the outer wall of the panel comprising the pinched region are in contact or bonded.

According to another aspect of the invention, the chamber includes an inlet opening and an outlet opening. The inlet opening receives air as part of a vehicle heating, ventilation and air-conditioning system. The outlet opening directs air towards a windshield and into a passenger compartment. The outlet opening may support a vent for directing air.

According to another aspect of the invention, a tether is configured to retain the air bag door from projecting into a vehicle passenger compartment during an air bag deployment. The tether may be attached across the tear guide, to the air bag door and a portion of the panel surrounding the air bag door.

According to another aspect of the invention, a foam is disposed on an outer surface of the outer wall of the panel and a skin is disposed on an outer surface of the foam.

According to another aspect of the invention, a method for making a vehicle interior panel is provided comprising the steps of providing a blow mold comprising at least two opposing dies. The dies are configured to form a mold cavity surface. The mold cavity surface includes a ridge configured to form a tear guide. The tear guide at least partially defines an air bag deployment opening. The dies of the blow mold are parted and a plastic material in the form of a parison is provided between the parted dies. The parison is then conformed to the mold cavity surface by injecting gas into the parison and moving the dies together. The plastic material is then allowed to cool and harden, and a panel is removed from the blow mold.

According to another aspect of the invention, the step of providing a blow mold includes providing a blow mold including a mold cavity surface configured to form a chamber in the panel.

According to another aspect of the invention, the method includes the additional steps of forming openings in the chamber and varying the thickness of the panel wall by varying the parison wall thickness.

BRIEF DRAWING DESCRIPTION

To better understand and appreciate the invention, refer to the following detailed description in connection with the accompanying drawings:

FIG. 4 is an enlargened fragmentary cross-sectional view of a tear guide constructed according to the present invention;

FIG. 5 is an enlargened fragmentary cross-sectional view of an alternative tear guide constructed according to the present invention.

DETAILED DESCRIPTION OF THE INVENTION

Figure 1:
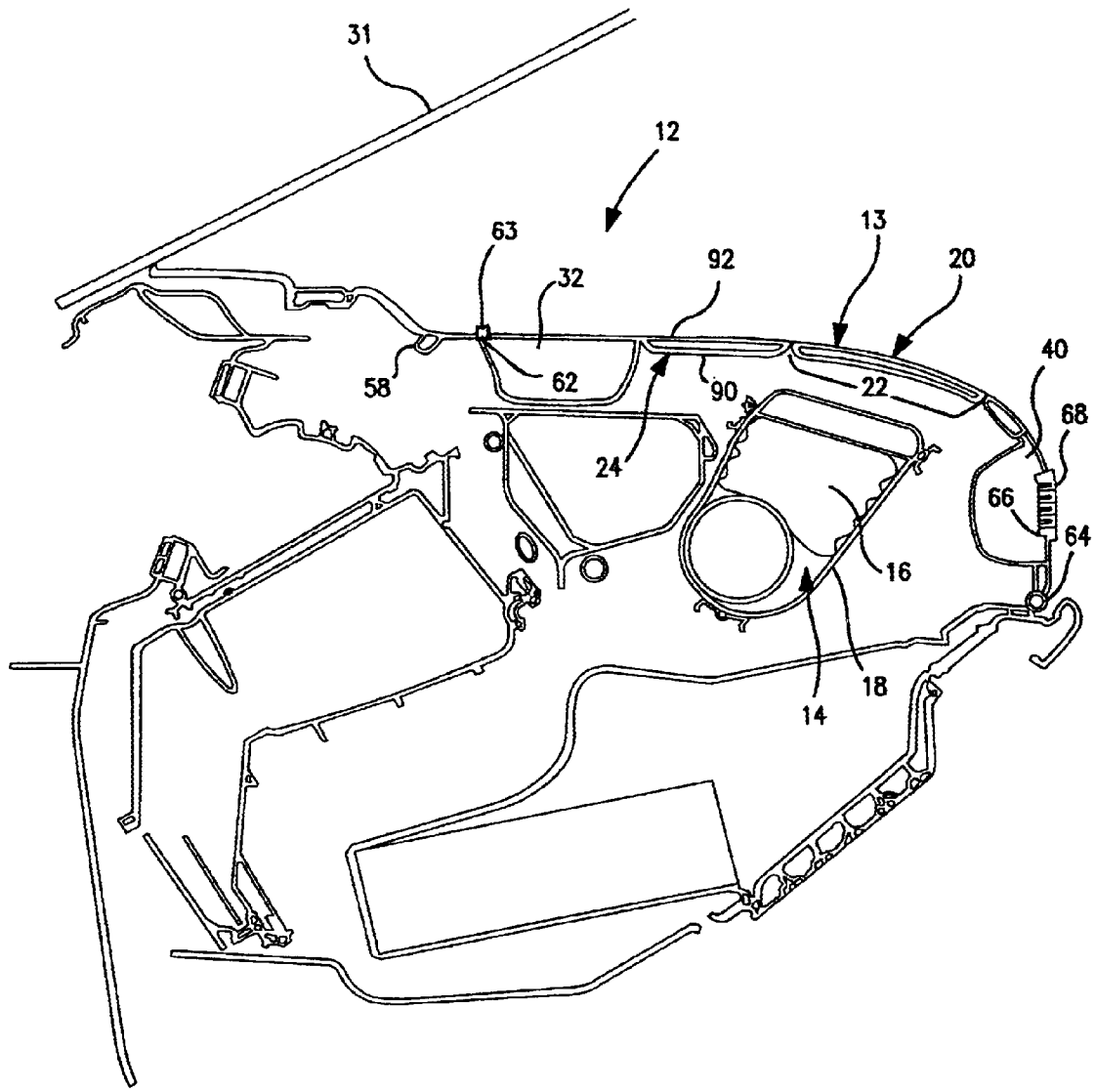
FIG. 1 is a schematic cross-sectional view of a vehicle interior panel constructed according to the present invention installed as part of an instrument panel assembly.

A vehicle interior panel 13 is disposed in a panel assembly, generally shown at 12 in FIG. 1 as an instrument panel assembly. The panel assembly 12 is configured to house various switches, instruments and accessories. The panel 13 is configured to overlie an inflatable restraint assembly generally indicated at 14 in FIG. 1. The inflatable restraint assembly 14 includes an air bag 16 disposed in an air bag dispenser 18. The panel 13 is installed directly in front of a front passenger seat in a vehicle.

Figure 2:
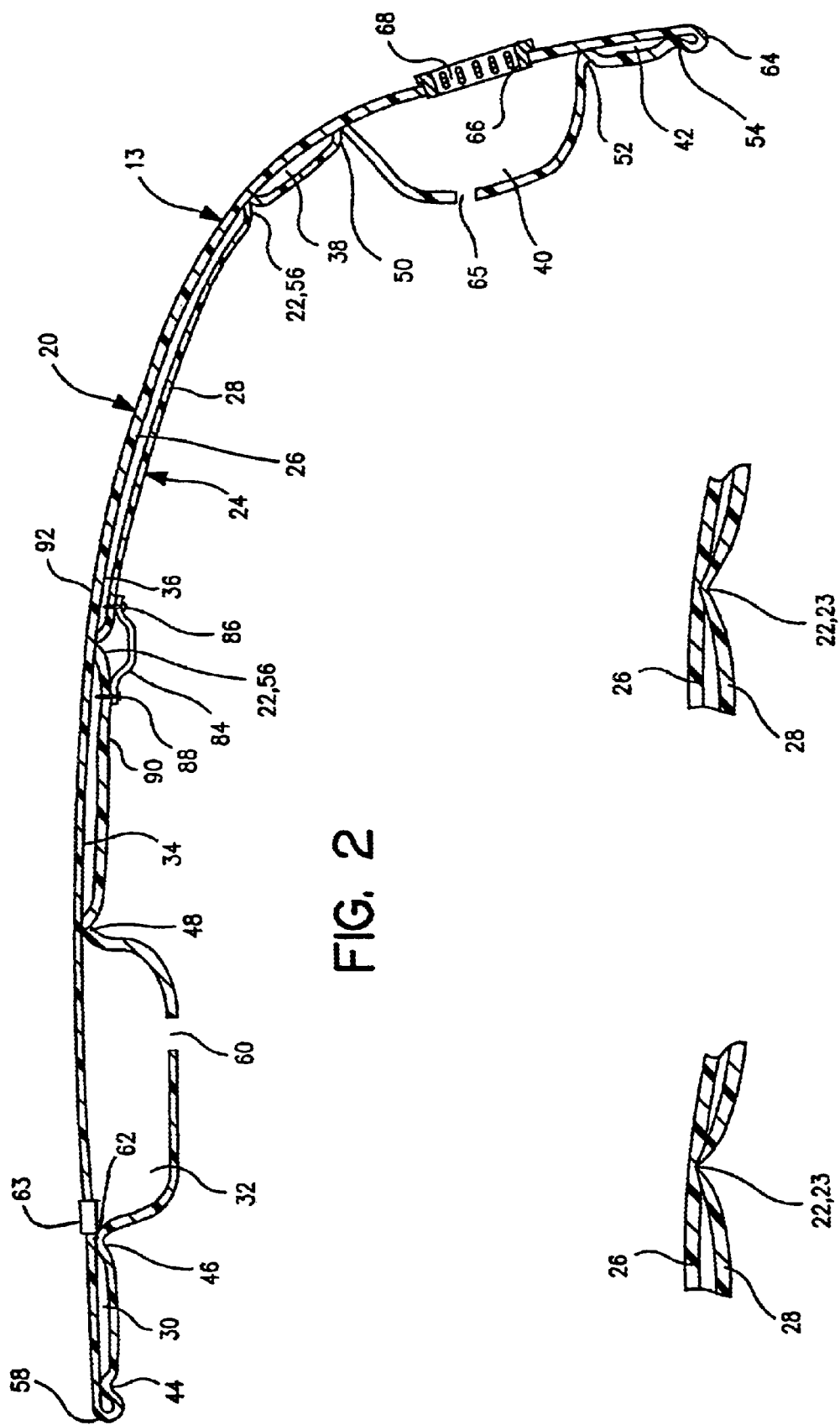
FIG. 2 is a cross-sectional side view of the vehicle interior panel of FIG 1.

As is best shown in FIG. 2, the panel 13 includes a double-layer construction in which a flattened tube 24 of plastic material forms two walls 26, 28 or layers of plastic material, connected together by integral side walls 58, 64 along the upper and lower edges in a generally layered disposition which forms an enclosure. The panel 13 preferably includes cavities or spaced regions best shown at 30, 32, 34, 36, 38, 40 and 42 in FIG. 2. At the spaced regions 30–42 the walls 26, 28 or layers are spaced-apart in a generally parallel disposition. The spaced regions 30–42 are at least partially separated and defined by adjacent pinched regions, shown at 44, 46, 48, 50, 52, 54 and 56 in FIG. 2, where the walls 26, 28 are preferably connected together.

Figure 3:
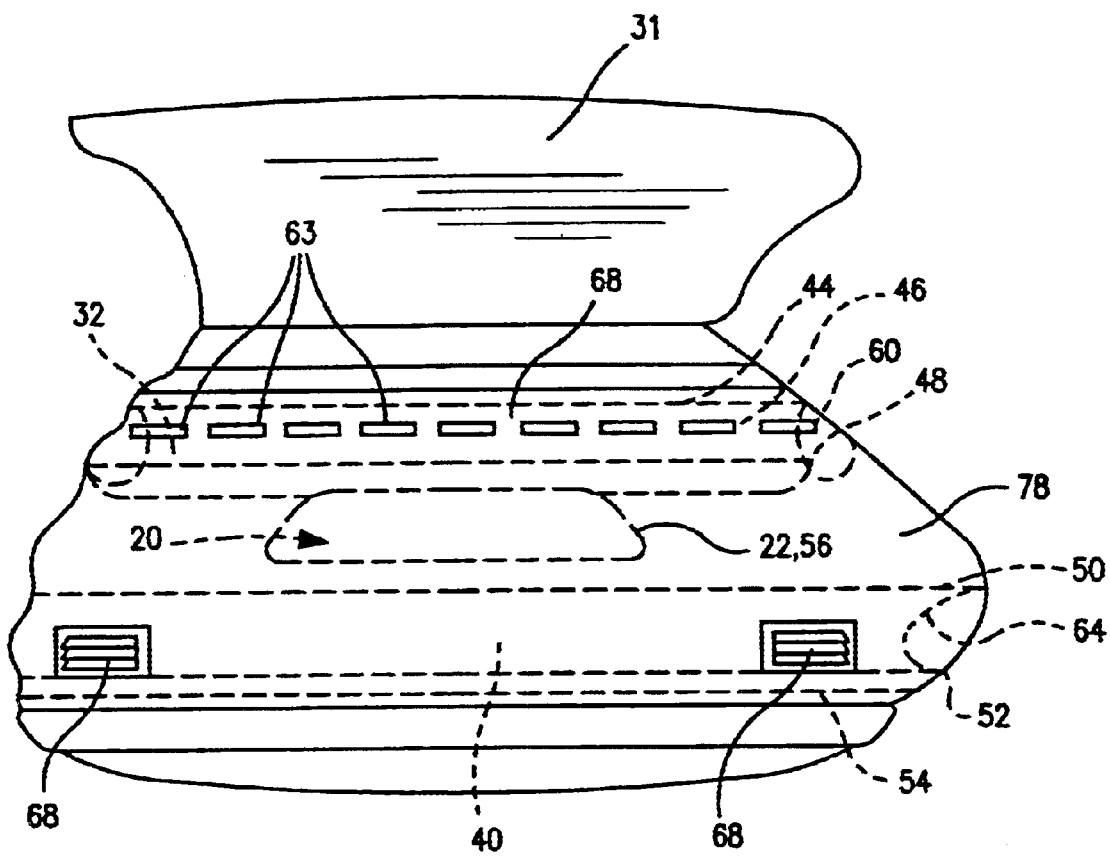
FIG. 3 is a fragmentary front view of the vehicle interior panel of FIG. 1.

An air bag door, generally indicated at 20 in FIGS. 1, 2 and 3, is formed in a portion of the panel 13 that overlies the air bag dispenser 18. The air bag door 20 is configured to provide an air bag deployment opening through which the air bag 16 may deploy. Preferably, the air bag door perimeter and the air bag deployment opening are at least partially defined by a tear guide 22, a weakened frangible area generally of reduced thickness configured to tear and/or break when the air bag 16 inflates and forces the door 20 to open. As shown in FIG. 4, the tear guide 22 preferably comprises an indentation 23 of at least one of the inner wall 28 and the outer wall 26 extending towards an outer surface 92 of the outer wall 26. More preferably, tear guide comprises an indentation which extends completely through inner wall 28 and partially through outer wall 26. However, alternatively indentation 23 may not extend completely through inner wall 28, but only partially through inner wall 28 and partially through outer wall 26 as shown in FIG. 5. As shown in FIG. 2 indentation 23 (in the form of tear guide 22) may also extend partially through inner wall 28 and not into outer wall 26 at all. As best shown in FIG. 3, pinched region 56 forms tear guide 22 and preferably forms a closed 360 degree (360°) pattern such as rectangle or oval in the panel 13 and defines the air bag door 20 in the panel 13. The defrost vents 63 are schematically shown in FIGS. 1–3.

The panel 13 may also be configured to facilitate the distribution of defrost air to a windshield 31. A first one of the spaced regions 32 is disposed along and adjacent side wall 58 of the panel 13. In the first spaced region 32 the walls 26, 28 or layers of the panel 13 are disposed farther apart and are configured to form a first elongated chamber 32 as best shown in FIG. 2. Also as shown in FIG. 2, the first spaced region or chamber 32 also includes an inlet opening 60 and a plurality of outlet openings 62 positioned to direct defog and defrost air toward the windshield 31 supported above and adjacent the panel assembly 12. The outlet openings 62 of the first chamber 32 are configured to be in fluid communication with a plurality of defrost vents schematically shown at 63 supported in the outer wall 26 of the panel 13. The defrost vents 63 direct defrost and/or defog air onto the windshield 31 disposed above the panel assembly 12.

The panel 13 may also be configured to facilitate the distribution of air to a passenger compartment of the vehicle. The air may be conditioned, e.g., heated and/or cooled air, or may be ambient air vented into the vehicle. A second one 40 of the spaced regions 30–42 is disposed along a side wall 64 of the panel 13. As with the first spaced region 32, in the second spaced region 40 the walls 26, 28 or layers of the panel 13 are disposed farther apart and are configured to form a second elongated chamber. The second spaced region or chamber 40 includes an inlet opening 65 and a plurality of outlet openings 66 positioned to direct conditioned and/or unconditioned air into the passenger compartment. The outlet openings 66 of the second chamber 40 are configured to be in fluid communication with a plurality of air conditioning vents 68 supported in the outer wall 26 of the panel 13. The air conditioning vents 68 direct conditioned and/or unconditioned air into the passenger compartment.

As shown in FIG. 2, the panel 13 further includes a tether 84 configured to retain the air bag door 20 from projecting into the passenger compartment during air bag deployment. The tether 84 is preferably a strip of flexible material such as fabric or nylon scrim that may be attached across the tear guide 22. Preferably, one end of the tether 84 is connected to the inner surface 90 of the air bag door 20 of the panel 13 via an attachment point 86 and another end of the tether 84 is connected to the inner surface 90 of the panel 13 surrounding the air bag door 20 via an attachment point 88. The inner surface 90 of the panel 13 is disposed opposite an outer surface 92 of the panel 13. Alternatively, the end of the tether 84 connected to the inner surface 90 of the panel 13 surrounding the air bag door 20 may be attached to any vehicle structure which retains the air bag door 20 from projecting into the passenger compartment during air bag deployment.

Figure 7:
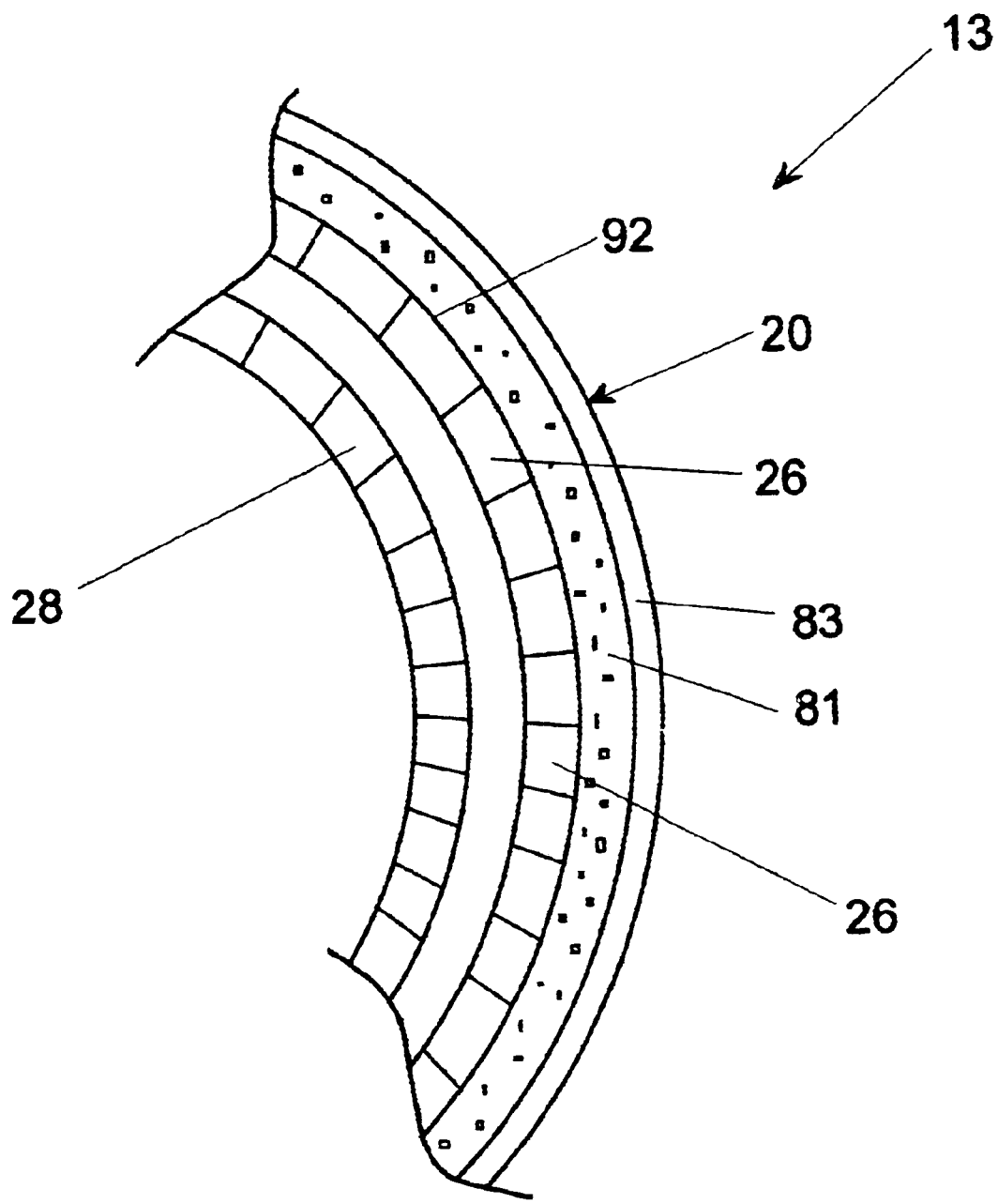
FIG. 7 is a schematic representation showing an enlarged cross-section view of a portion 7 of the vehicle interior panel of FIG. 1.

In other embodiments, as shown in FIG. 7, a layer of foam 81 may be disposed on the outer surface 92 of the panel 13. Also, a skin layer 83 may be disposed on and adhered to an outer surface of the foam layer 81. In other embodiments, a panel 13 constructed according to the invention may be configured for installation in any interior trim member including, but not limited to, a vehicle door panel, quarter panel, package tray, console, headliner, and seat. In other embodiments, the walls 26, 28 or layers of the panel 13 may not actually touch or be bonded together in one or more of the pinched regions 44–56. Instead, the one or more pinched regions 44–56 may bring the walls 26, 28 or layers closer together than the adjacent spaced regions 30–42. In other embodiments the pinched region 56 forming the tear guide 22 may define only a portion of the air bag door 20, e.g., a 270 degree tear seam rather than a 360 degree tear guide 22. The remaining portion of the door periphery may serve as an integral hinge and possibly eliminate the need for tether 84. In still other embodiments, the first and second elongated chambers may have cross-sectional shapes that are not generally uniform along the lengths of the chambers. Instead, the cross sectional shape of each chamber may vary along the length of each respective chamber to accommodate and avoid adjacent structures or control air flow.

Figure 6:
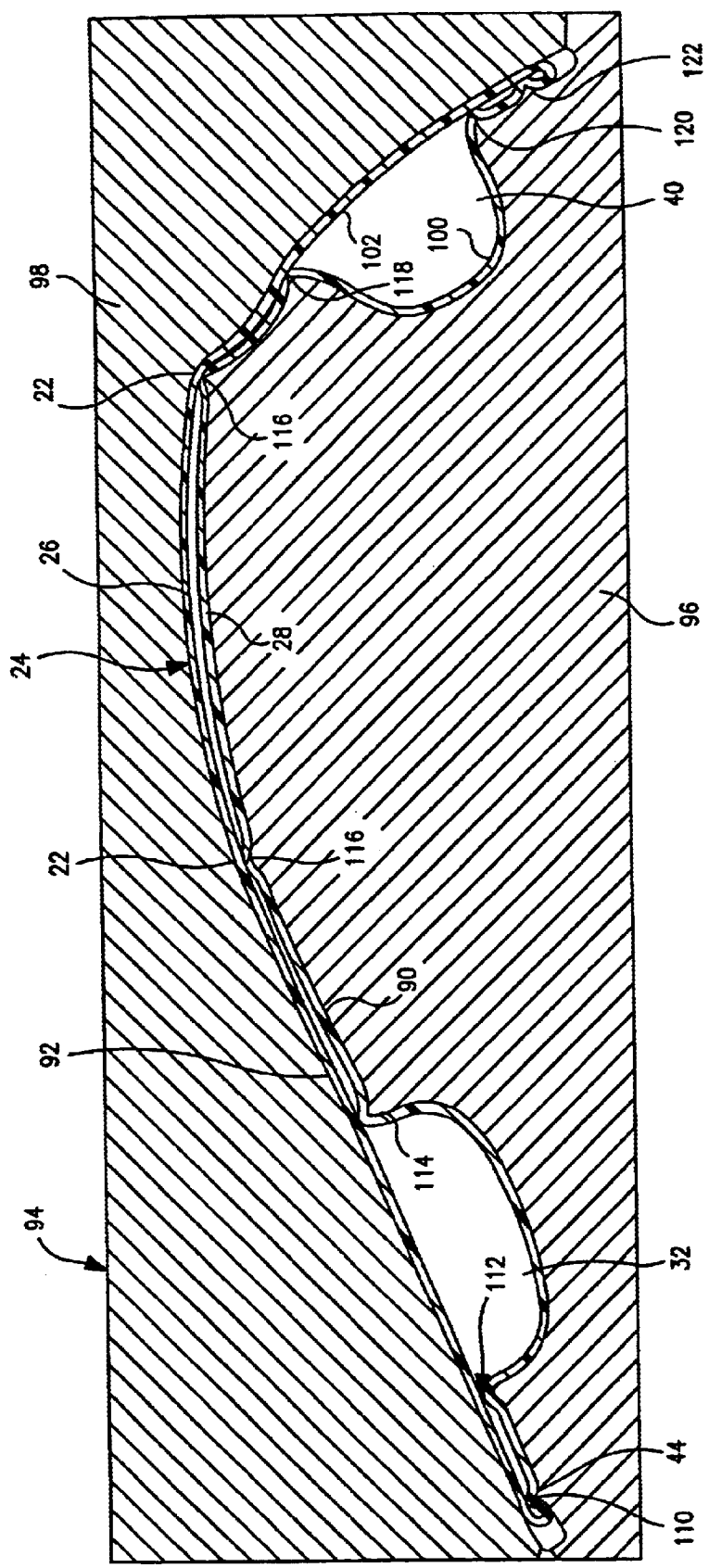
FIG. 6 is a cross-sectional side view of the vehicle interior panel being constructed according to the invention in a blow mold.

An interior automotive panel, such as the panel 13 shown in the drawings and described above, can be constructed by first providing a blow mold, generally indicated at 94 in FIG. 6, that includes at least two opposing dies 96, 98. The dies 96, 98 are configured to close together to form a mold cavity surface 100, 102. The mold cavity surface 100, 102 is contoured to compliment the exterior shape of the desired resultant double-walled panel 13 including the first and second elongated chambers 32, 40. The inner die 96 is configured to form the inner surface 90 of the panel 13, includes seven ridges 110, 112, 114, 116, 118, 120, 122 that extend outwardly from the inner die surface 100. Four ridges 112, 114, 118, 120 of the seven ridges 110–122 are preferably configured to crease the inner wall 28 or layer of the double-walled panel 13 into contact with the outer wall 26 or layer of the panel in respective patterns outlining the respective first and second elongated chambers 32, 40. A fifth ridge 116 of the seven ridges 110–122 is preferably configured to crease the inner wall 28 of the double-walled panel 13 to form the tear guide 22 that defines the outline of the air bag door 20 in the panel 13. The remaining two ridges 110, 122 of the seven ridges 110–122 form creases 44 and 54 adjacent and along the side walls of the panel 58, 64.

The dies 96, 98 of the blow mold 94 are first parted and a plastic material that will form the panel 13 is extruded as a parison (i.e. a hollow tube or other prefromed shape of molten thermoplastic) forming a tube 24 between the parted dies 96, 98 from an extrusion head. The parison includes inner and outer wall portions that will form the respective inner and outer walls 28, 26 or layers of the panel 13.

As shown in FIG. 6, the parison is then clamped between the dies 96, 98 by moving the dies 96, 98 together. The clamping operation partially flattens the parison to form the inner and outer walls 28, 26 or layers of the double-walled panel 13. The first four ridges 112, 114, 118, 120 crease the inner wall portion of the parison causing the creased portions to preferably contact and bond to an inner surface of the outer wall portion of the parison, outlining and defining the respective first and second elongated chambers 32, 40. Likewise, the fifth ridge 116 preferably creases the inner wall portion of the parison causing the creased inner wall portion to contact and bond to an opposing portion of the outer wall and form a region of reduced cross section, i.e., the tear guide 22 that defines the air bag door 20 in the panel 13. Preferably before dies 96, 98 are completely clamped together, the parison is at least partially conformed to the mold surface 100, 102 by injecting gas into the parison. The gas injection inflates and forces the inner and outer wall sections of the parison into contact with the mold cavity surfaces 100, 102 of the respective inner and outer dies 96, 98. The plastic material forming the panel 13 is then allowed to cool and harden before it is removed from the blow mold 94.

This process, in a single operation, forms an integral air bag door 20 having double-wall construction and integral chambers 32, 40. The inlet and outlet openings 60, 62, 65, 66 are then formed in the elongated chambers.

The thickness of the panel 13 at various predetermined regions along its inner and outer walls 28, 26 may be controlled during parison extrusion by a procedure known in the art as parison programming. According to this procedure, a controller is programmed to adjust the extrusion head to vary parison wall thickness both circumferentially and longitudinally during parison extrusion. This procedure is used to optimize characteristics such as energy absorption in certain portions of the panel 13 and to ease modifications for the testing of parts during prototyping and validation phases. Parison programming can also be used to compensate for longitudinal parison wall thickness variations that would otherwise result from increased stretching in upper portions of the parison as the length, and therefore the weight, of the parison grows during extrusion.

In other embodiments the ridge or ridges 110–122 in the inner die 96 may not all extend far enough out from the mold surface 100 of the inner die 96 to cause portions of the opposing inner and outer wall sections of the parison to actually meet and bond together. Instead, certain of the ridge or ridges 110–122 may only bring the inner wall portion close enough to the outer wall portion to form an area of narrowed cross-section in the double-walled panel 13.

I intend this description to illustrate certain embodiments of the invention rather than to limit the invention. Therefore, I have used descriptive words rather than limiting words. Obviously, it is possible to modify this invention from what the description teaches. Within the scope of the claims, one may practice the invention other than as described.

I claim:

1. A blow-molded vehicle interior panel of unitary construction, the panel comprising:

an inner wall and an outer wall connected by an integral side wall;

a portion of the panel comprising an air bag deployment opening, the air bag deployment opening at least partially defined by a tear guide; and a portion of the panel comprising at least one chamber, the chamber located between the inner wall of the panel and the outer wall of the panel, said tear guide comprising a pinched region where said walls are in contact comprising an indentation that extends partially into said inner wall and partially into said outer wall.

2. A vehicle interior panel as defined in claim 1 wherein the panel is part of an instrument panel assembly.

3. A vehicle interior panel as defined in claim 1 wherein the tear guide comprises at least a portion of a perimeter of an air bag door.

4. A vehicle interior panel as defined in claim 3 further including a tether configured to retain the air bag door to the instrument panel during air bag deployment.

5. A vehicle interior panel as defined in claim 4 wherein the tether is attached across the tear guide.

6. A vehicle interior panel as defined in claim 5 wherein the tether is attached to the air bag door and a portion of the panel surrounding the air bag door.

7. A vehicle interior panel as defined in claim 1 wherein said pinched region where said walls are in contact comprise walls that are bonded.

8. A vehicle interior panel as defined in claim 1 wherein the inner wall of the panel and the outer wall of the panel comprise a pinched region at least partially defining the chamber.

9. A vehicle interior panel as defined in claim 8 wherein the inner wall of the panel and the outer wall of the panel comprising the pinched region at least partially defining the chamber, are in contact.

10. A vehicle interior panel as defined in claim 9 wherein the pinched region at least partially defining the chamber, which are in contact, are bonded.

11. A vehicle interior panel as defined in claim 8 wherein the chamber includes an inlet opening and an outlet opening for directing air.

12. A vehicle interior panel as defined in claim 11 wherein the outlet opening contains a vent for directing air.

13. A vehicle interior panel as defined in claim 11 wherein the outlet opening directs air toward a windshield.

14. A vehicle interior panel as defined in claim 11 wherein the outlet opening directs air into a vehicle passenger compartment.

15. A vehicle interior panel as defined in claim 11 wherein the inlet opening receives air as part of a vehicle heating, ventilation and air-conditioning system.

16. A vehicle interior panel as defined in claim 1 wherein a foam is disposed on an outer surface of the outer wall.

17. A vehicle interior panel as defined in claim 16 wherein a skin is disposed on an outer surface of the foam.

18. A blow-molded vehicle interior panel of unitary construction, the panel comprising:

an inner wall and an outer wall connected by an integral side wall, the outer wall containing an outer surface;

a portion of the panel comprising an air bag deployment opening, the air bag deployment opening at least partially defined by a tear guide; and a portion of the panel comprising at least one chamber, the chamber located between the inner wall of the panel and the outer wall of the panel said tear guide comprising a pinched region where said walls are in contact comprising an indentation that extends completely through said inner wall and partially into said outer wall but not through said outer surface of said outer wall.

19. A vehicle interior panel as defined in claim 18 wherein the tear guide comprises at least a portion of a perimeter of an air bag door.

20. A vehicle interior panel as defined in claim 19 further including a tether configured to retain the air bag door to the instrument panel during air bag deployment.

21. A vehicle interior panel as defined in claim 20 wherein the tether is attached across the tear guide.

22. A vehicle interior panel as defined in claim 21 wherein the tether is attached to the air bag door and a portion of the panel surrounding the air bag door.

23. A vehicle interior panel as defined in claim 18 wherein said pinched region where said walls are in contact comprise walls that are bonded.

24. A vehicle interior panel as defined in claim 18 wherein the inner wall of the panel and the outer wall of the panel comprise a pinched region at least partially defining the chamber.

25. A vehicle interior panel as defined in claim 24 wherein the inner wall of the panel and the outer wall of the panel comprising the pinched region at least partially defining the chamber, are in contact.

26. A vehicle interior panel as defined in claim 24 wherein the pinched region at least partially defining the chamber, which are in contact, are bonded.

27. A vehicle interior panel as defined in claim 24 wherein the chamber includes an inlet opening and an outlet opening for directing air.

28. A vehicle interior panel as defined in claim 27 wherein the outlet opening contains a vent directing air.

29. A vehicle interior panel as defined in claim 27 wherein the outlet opening directs air toward a windshield.

30. A vehicle interior panel as defined in claim 27 wherein the outlet opening directs air into a vehicle passenger compartment.

31. A vehicle interior panel as defined in claim 27 wherein the inlet opening receives air as part of a vehicle heating, ventilation and air-conditioning system.

32. A vehicle interior panel as defined in claim 18 wherein a foam is disposed on an outer surface of the outer wall.

33. A vehicle interior panel as defined in claim 32 wherein a skin is disposed on an outer surface of the foam.

* * * * *